United States Patent
Kuboyama

(10) Patent No.: US 9,330,304 B2
(45) Date of Patent: *May 3, 2016

(54) INFORMATION PROCESSING APPARATUS AND METHOD FOR CONTROLLING THE SAME

(71) Applicant: CANON KABUSHIKI KAISHA, Tokyo (JP)

(72) Inventor: Hideo Kuboyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,655

(22) Filed: Aug. 10, 2015

(65) Prior Publication Data

US 2015/0347828 A1    Dec. 3, 2015

Related U.S. Application Data

(63) Continuation of application No. 13/899,322, filed on May 21, 2013, now Pat. No. 9,129,182.

(30) Foreign Application Priority Data

Jun. 7, 2012   (JP) ................. 2012-129888

(51) Int. Cl.
*G06K 9/00* (2006.01)
*G06K 9/32* (2006.01)
*G06K 9/34* (2006.01)

(52) U.S. Cl.
CPC ........ *G06K 9/00355* (2013.01); *G06K 9/00771* (2013.01); *G06K 9/3241* (2013.01); *G06K 9/34* (2013.01)

(58) Field of Classification Search
CPC ............ G06K 9/00355; G06K 9/3241; G06K 9/00771; G06K 9/34
See application file for complete search history.

(56) References Cited

U.S. PATENT DOCUMENTS

| | | | |
|---|---|---|---|
| 6,184,858 B1* | 2/2001 | Christian | G01S 3/7865 345/634 |
| 7,227,893 B1 | 6/2007 | Srinivasa et al. | |
| 8,208,733 B2* | 6/2012 | Park | G06K 9/00771 382/199 |
| 9,129,182 B2* | 9/2015 | Kuboyama | G06K 9/3241 |
| 2003/0099378 A1 | 5/2003 | Ide | |
| 2010/0103106 A1* | 4/2010 | Chui | G06F 3/017 345/166 |
| 2011/0211754 A1 | 9/2011 | Litvak et al. | |
| 2012/0092495 A1 | 4/2012 | Yano | |
| 2013/0257720 A1* | 10/2013 | Noda | G06F 3/017 345/157 |
| 2014/0064566 A1* | 3/2014 | Shreve | G06K 9/00335 382/107 |
| 2015/0092051 A1* | 4/2015 | Furukawa | G06T 7/20 348/143 |

FOREIGN PATENT DOCUMENTS

| | | |
|---|---|---|
| CN | 100591100 C | 2/2010 |
| CN | 101907923 A | 12/2010 |
| CN | 102324019 A | 1/2012 |
| WO | 2012/016374 A1 | 2/2012 |

* cited by examiner

*Primary Examiner* — Gregory M Desire
(74) *Attorney, Agent, or Firm* — Canon U.S.A., Inc. IP Division

(57) ABSTRACT

An information processing apparatus detects a moving member that moves in a background area and that includes an object other than a recognition target. The apparatus sets a partial area as a background undetermined area if the moving member is present in the background area and sets a partial area as a background determined area if it is regarded that the recognition target is not present in the background area in each of the partial areas set as the background undetermined area. The apparatus recognizes an operation caused by the recognition target that moves in the background determined area.

10 Claims, 10 Drawing Sheets

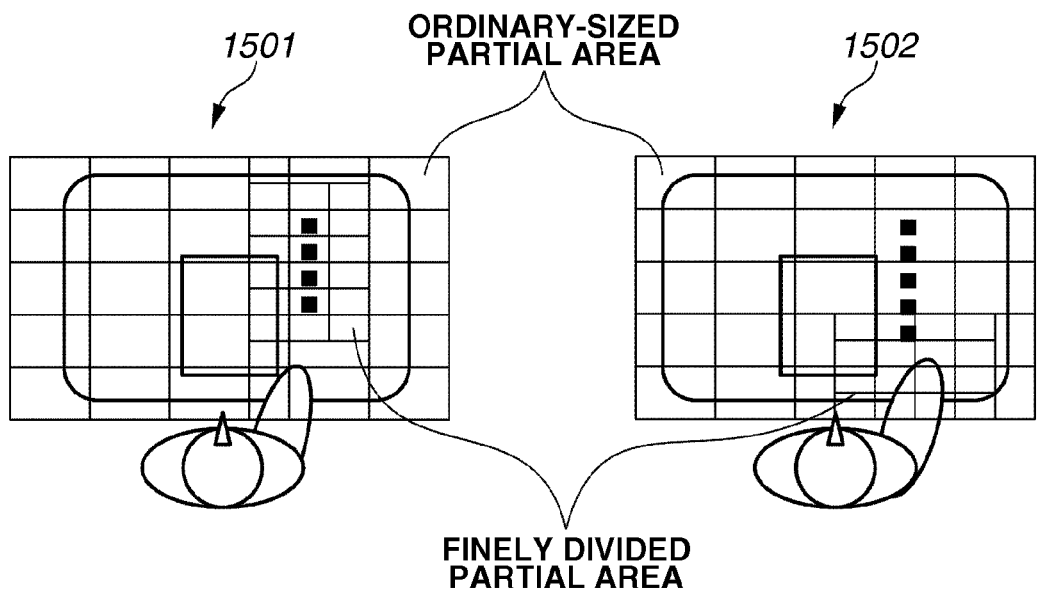
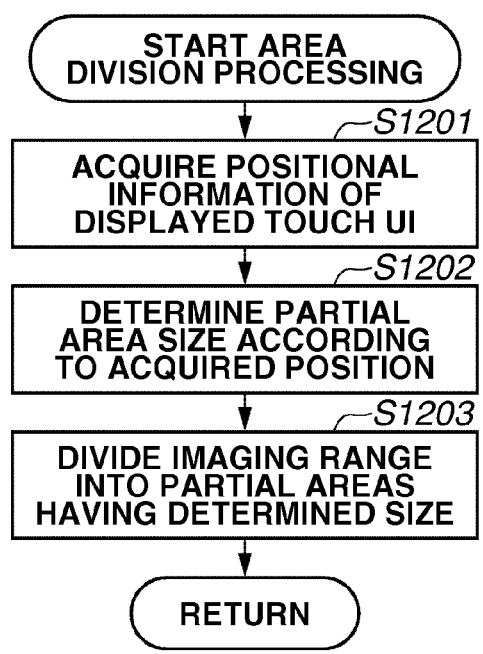
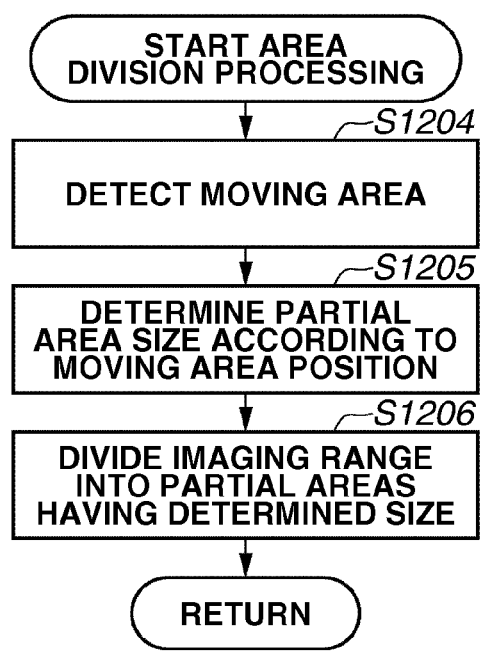

FIG.9
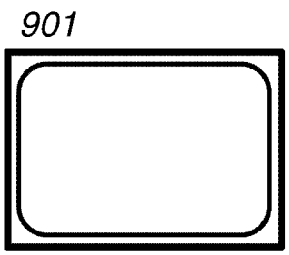
901
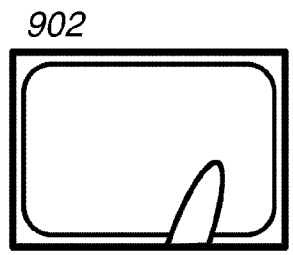
902
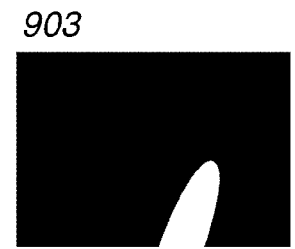
903
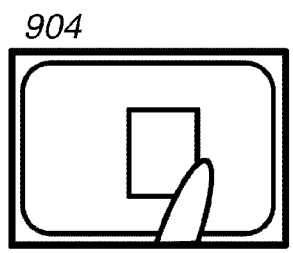
904
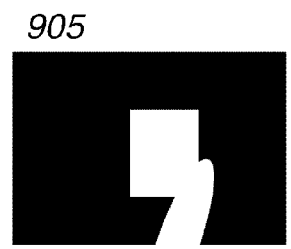
905
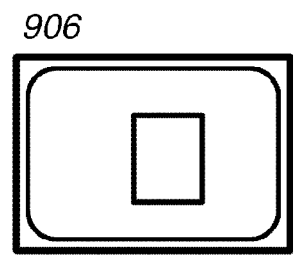
906
907
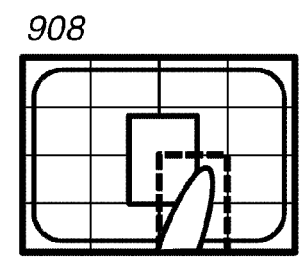
908
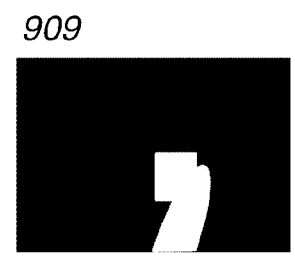
909
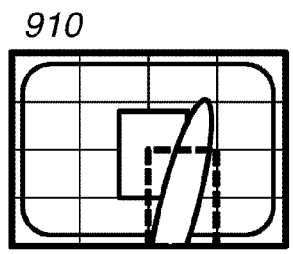
910
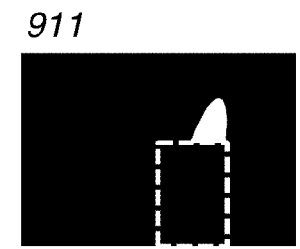
911

INFORMATION PROCESSING APPARATUS AND METHOD FOR CONTROLLING THE SAME

RELATED APPLICATIONS

This application is a Continuation of U.S. patent application Ser. No. 13/899,322 filed on May 21, 2013, which claims the benefit of Japanese Application No. 2012-129888 filed Jun. 7, 2012, which are hereby incorporated by reference herein in their entirety.

BACKGROUND OF THE INVENTION

1. Field of the Invention

The present invention relates to an information processing apparatus that can recognize user actions.

2. Description of the Related Art

A device that can detect a hand area (i.e., an area that includes a user hand) from an image captured by a visible light camera or an infrared ray camera and can recognize a gesture operation or an operation performed on a displayed user interface based on the movement and the position of the detected area is becoming widely used.

As discussed in Japanese Patent Application Laid-Open No. 2009-104297, a difference between an image obtained by capturing a user hand that is present in the background and a background image obtained by capturing only the background can be extracted using the background subtraction technique, which is a technique capable of detecting a hand that performs a gesture operation. Using the above-mentioned method is useful to detect the hand area and determine an operation based on the shape or the movement of the detected hand area.

Further, a method for managing a background image behind a substantial object discussed in Japanese Patent Application Laid-Open No. 2010-92224 includes dividing an imaging range into a plurality of partial areas and discriminating a moving body area that includes a moving body (e.g., a human object) from a background area that does not include any moving body for each partial area of an input image. The method further includes combining the latest background areas obtained from respective partial areas in such a way as to obtain the latest background image by updating the background image that does not include any moving body in the entire imaging range.

However, to accurately detect a recognition target (e.g., a user hand), in the above-discussed methods it is important that an object included in the background image is stationary. For example, if the recognition target moves together with an object other than the recognition target in the background area, an operation originated by the movement of the recognition target may not be accurately detected.

SUMMARY OF THE INVENTION

The present invention is directed to a technique capable of accurately recognizing an operation based on the movement of a recognition target, such as a user hand.

According to an aspect of the present invention, an information processing device includes a detection unit configured to detect a moving member moving in a background area and including an object other than the recognition target, a setting unit configured to set a partial area of partial areas constituting the background area as a background undetermined area if the moving member detected by the detection unit is present in the background area, and further configured to set a partial area as a background determined area if it is regarded that the recognition target is not present in the background area in each of the partial areas set as the background undetermined area, and a recognition unit configured to recognize an operation caused by the recognition target that moves in the background determined area.

Further features of the present invention will become apparent from the following description of exemplary embodiments with reference to the attached drawings.

BRIEF DESCRIPTION OF THE DRAWINGS

FIG. 8A illustrates an example of partial areas divided by the information processing apparatus, FIG. 8B is a flowchart illustrating an example of area division processing that can be performed by the information processing apparatus, and FIG. 8C is a flowchart illustrating an example of area division processing that can be performed by the information processing apparatus.

FIG. 9 depicts images captured at a high-angle that indicate various states of an operation surface.

DESCRIPTION OF THE EMBODIMENTS

Exemplary embodiments of the present invention are described in detail below with reference to attached drawings. Constituent components described in the following exemplary embodiments are mere examples. The scope of the present invention is not limited to the following exemplary embodiments.

Figure 1A:
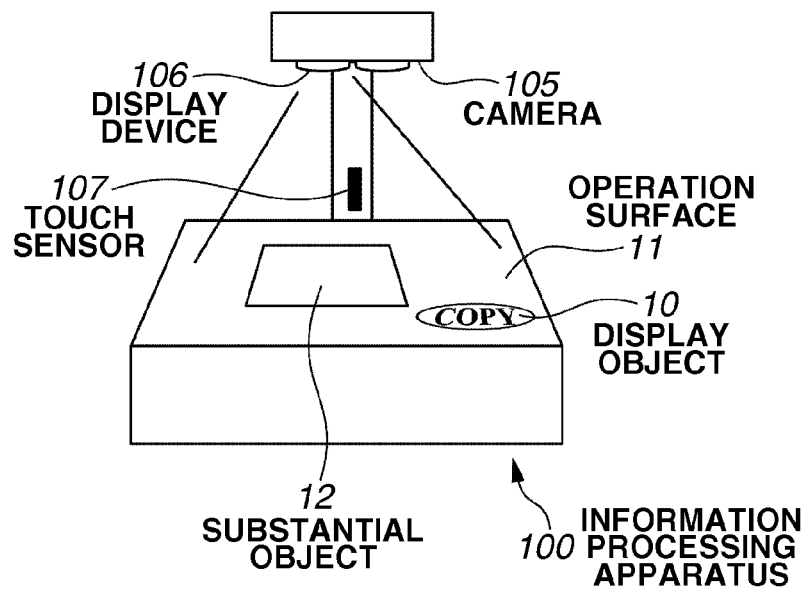
FIG. 1A illustrates an appearance of an information processing apparatus.

FIG. 1A illustrates an appearance of an information processing apparatus 100 according to an exemplary embodiment. The information processing apparatus 100 includes a projector placed at an upper position above an operation surface 11. The projector can project a projection image that includes a display object 10 (e.g., a button or an icon) for a user interface, which enables a user to touch the operation surface 11 to perform an input operation. A camera 105, which is placed at an upper position, can recognize a user action based on a high-angle shot video or can obtain image data of a substantial object 12 positioned in the background area of the operation surface 11. A touch sensor 107 can detect the distance between a recognition target (e.g., a user hand) and the operation surface 11 to determine whether the user has touched the operation surface 11.

Figure 1B:
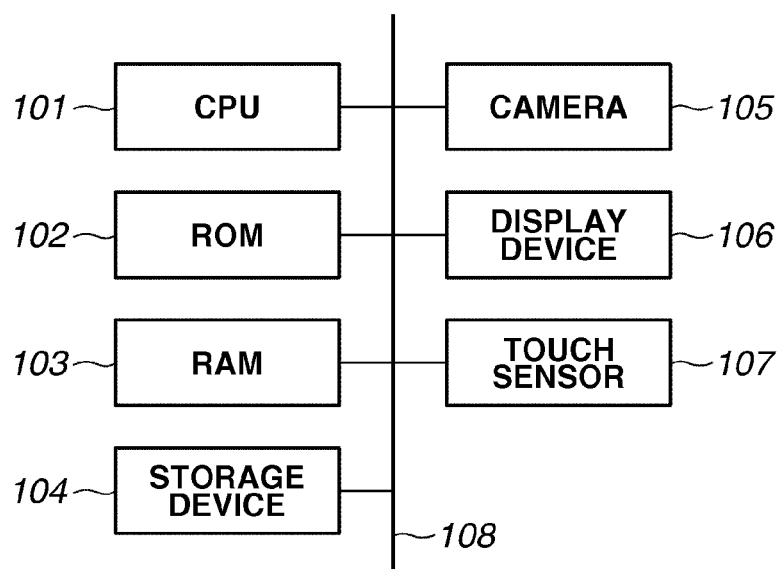
FIG. 1B illustrates a hardware configuration of the information processing apparatus.

FIG. 1B illustrates a hardware configuration of the information processing apparatus according to the present exemplary embodiment. In FIG. 1B, a central processing unit (CPU) 101 can execute a control program to perform calculations and logical determinations for various types of processing to be performed by the information processing apparatus, and can control each constituent component connected thereto via a system bus 108.

A read only memory (ROM) 102 is a program memory, which stores the control program to be executed by the CPU 101. The program stored in the ROM 102 includes various types of processing procedures described below with reference to following flowcharts. A random access memory (RAM) 103 is usable for the CPU 101 to provide a work area, an error processing data save area, and a control program loading area.

A storage device 104 is a hard disk or an external storage device that is connected to the information processing apparatus. The storage device 104 stores data and programs relating to the present exemplary embodiment. The camera 105 is an imaging unit configured to capture an input image. In the present exemplary embodiment, the camera 105 is placed at an upper position to capture an image of an operation area. A display device 106 is, for example, a well-known display device or a projector, which can display various types of display objects and images based on electronic data.

In the present exemplary embodiment, when the projector projects a projection image to be displayed on the operation surface 11, the touch sensor 107 detects a user touch operation on the operation surface 11 based on the distance between a recognition target (e.g., user hand), which is used by a user to perform an operation, and the operation surface 11. The touch sensor 107 is, for example, an infrared ray sensor.

In the present exemplary embodiment, the camera 105 and the display device 106 are incorporated in the information processing apparatus. However, the information processing apparatus can be configured to control an externally connected camera and an externally connected display device.

Figure 2A:
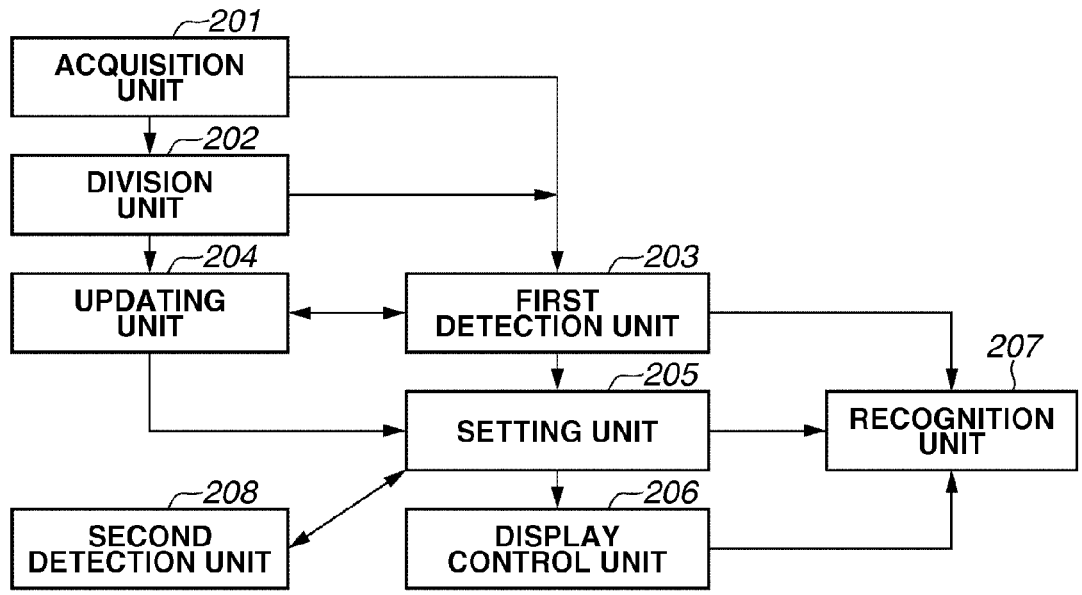
FIGS. 2A and 2B illustrate functional configurations of the information processing apparatus.

FIG. 2A illustrates a functional configuration of the information processing apparatus according to the present exemplary embodiment. The information processing apparatus illustrated in FIG. 2A includes an acquisition unit 201, a division unit 202, a first detection unit 203, an updating unit 204, a setting unit 205, a display control unit 206, a recognition unit 207, and a second detection unit 208, which can be constituted by the CPU 101, the ROM 102, and the RAM 103. The acquisition unit 201 is configured to acquire input images captured by the camera 105.

The division unit 202 is configured to divide an imaging range of the camera 105 into a plurality of partial areas. The division unit 202 can divide input images and background images captured by the camera 105 into a plurality of partial areas so that each partial area can be processed independently.

The first detection unit 203 is configured to detect a specific background area in which a moving member is present, from an input image, using the background subtraction technique. Further, the first detection unit 203 is configured to determine whether the detected moving member includes a recognition target or any object other than the recognition target.

The updating unit 204 is configured to control a background image to be used when the first detection unit 203 detects a moving member. If necessary, the updating unit 204 performs processing for updating a background image based on an input image. The setting unit 205 is configured to set each partial area as a background determined area or a background undetermined area. In this case, for each partial area, the setting unit 205 controls validation/invalidation with respect to a display object to be displayed on a user interface by the display device 106 and sends a validation/invalidation notification to the display control unit 206.

In the present exemplary embodiment, the setting unit 205 sets a partial area in which a moving member detected by the first detection unit 203 is present on the background as a background undetermined area. Further, if the moving member stops or disappears in a background undetermined area, the setting unit 205 regards that the recognition target is not present in the background area and sets the area as a background determined area.

The display control unit 206 is configured to generate a display image to control the content to be displayed on the operation surface by the display device 106, and is configured to output the generated display image to the display device 106. More specifically, the display control unit 206 is configured to manage the position of each display object that constitutes the display image.

The recognition unit 207 is configured to recognize a user operation based on the movement and the shape of a moving member detected by the first detection unit 203 in the background determined area having been set by the setting unit 205. The touch sensor 107 constitutes the recognition unit 207.

The user operation recognized by the recognition unit 207 in the present exemplary embodiment is, for example, a touch operation or a gesture operation using a recognition target object (e.g., a user hand). The touch operation is an operation performed by a user who touches an object displayed on the operation surface to instruct executing processing associated with the touched object.

The gesture operation is an operation performed by a user who moves a recognition target object in such a way as to coincide with a gesture model (i.e., a pattern having been set beforehand) to instruct executing processing associated with the gesture model.

In recognizing a touch operation, the recognition unit 207 recognizes a touched display object based on positional information of the recognition target object whose movement coincides with the gesture model and positional information of the display object obtained from the display control unit 206.

The second detection unit 208 is configured to analyze an input image and detect the position of a moving member detected by the first detection unit 203, which has entered the imaging range. However, the second detection unit 208 can be omitted if it is unnecessary. A modified example using the second detection unit 208 is described below.

FIG. 9 illustrates examples of high-angle shot images (i.e., input images) captured in various states of the operation surface. For example, an image 901 is an image of the operation table captured in a state where nothing is placed on the table. The image 901 is usable as an initial state background image in the background subtraction technique.

An image 902 is an input image of the operation table captured in a state where a moving member is present thereon. An image 903 is an image of the moving member that can be detected by extracting a difference between the image 901 and the image 902.

In the present exemplary embodiment, the moving member is an object (or an object group) that is an area extracted as a difference between a background image and an input image and gives a change to the extracted area, regardless of a moving state during the detection. Using the above-mentioned background subtraction technique is effective to detect a moving member and trace the movement of the detected member in response to each of input images that can be obtained from the camera 105 at predetermined intervals.

In the present exemplary embodiment, a user uses a hand to perform a gesture operation. Therefore, the user hand is a target to be recognized by the information processing apparatus. The moving member to be detected in the image 902 is the user hand (i.e., the recognition target) itself.

Accordingly, the information processing apparatus applies pattern matching to the movement of the moving member to be detected with reference to each hand gesture stored beforehand and recognizes a gesture having a high matching score as the gesture operation performed by the user.

An image 904 is an input image captured in a state where a substantial object (e.g., a document printed on a paper) is placed on the operation surface when a user performs an operation for reading an image from the paper document with the camera 105 of the information processing apparatus. For example, an image 905 of an object group is obtainable when a difference between the background image and the input image 904 is extracted without updating the background image from the initial state of the image 901. The object group of the image 905 includes both the user hand moving in the background and the paper document, which can be detected as a single moving member.

In this case, accurately recognizing the hand gesture operation based on the pattern matching applied to the hand gesture is difficult, although it is feasible to trace the moving member.

To detect the user hand (i.e., the recognition target) exclusively based on the background subtraction technique, it is necessary to acquire an image of the document placed on the operation table without including the user hand, as illustrated in an image 906, which is usable as a background image. An image 907 including only the user hand (i.e., the moving member) is obtainable when a difference between the updated background image 906 and the input image 904 is extracted. However, to capture the updated background image 906, it is necessary for a user to remove the hand temporarily from the imaging range of the camera 105.

In such a case, to obtain a background image usable to detect an area including the recognition target (e.g., user hand) from the captured image based on the background subtraction technique, the information processing apparatus according to the first exemplary embodiment divides the image into a plurality of areas and determines the background image for each partial area.

An image 908 includes the imaging range of the camera 105 that is divided into 16 partial areas in an input image similar to the input image 904. In this case, if necessary, the information processing apparatus can update the background image for each partial area divided as mentioned above. Thus, the information processing apparatus can obtain an appropriate background image without requiring the user of removing the hand completely from the imaging range.

In the state of the image 908, if the background subtraction technique using the initial state background image is applied to each partial area to detect the moving member, the initial state background image is directly usable in an area that does not include any moving member. Further, when the moving member is detected based on a difference in comparison with the initial state background image, the placed paper document immediately stops while the user hand continuously moves without perfectly stopping.

Accordingly, the information processing apparatus can newly update the background image based on the input image in an area including only the paper document. In other words, the information processing apparatus does not update the background image in two areas in which the user hand is present (i.e., an area surrounded with a dotted line) in the image 908.

If a difference between the initial state background image 901 and the input image is extracted for a partial area in which the background is not updated, there is a higher possibility of detecting a part of the paper document together with the recognition target as understood from an image 909. More specifically, in this case, the user hand cannot be accurately detected and the action may be erroneously recognized.

On the other hand, in the first exemplary embodiment, if a moving member including a substantial object other than the recognition target is detected, the information processing apparatus divides the background image into a plurality of partial areas and determines the background image for each partial area. Then, the information processing apparatus recognizes an operation originated from a user action detected based on the background subtraction technique in only the area for which the background image has been determined.

Figure 3:
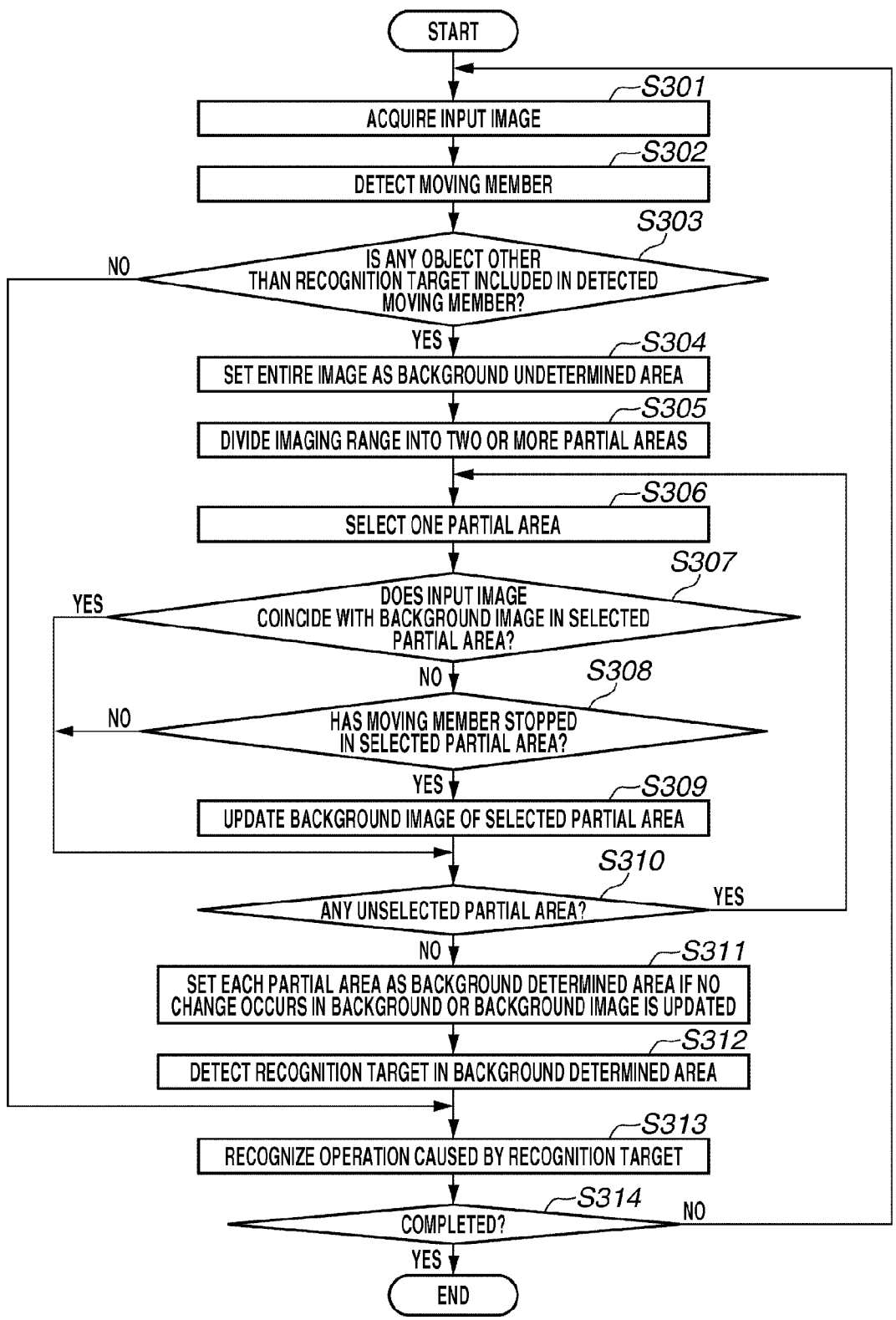
FIG. 3 is a flowchart illustrating an example of user action originated operation recognition processing.

FIG. 3 is a flowchart illustrating user action originated operation recognition processing that can be performed by the information processing apparatus according to the present exemplary embodiment. Processing to be performed in each step is described in detail below with reference to FIG. 3. In the present exemplary embodiment, the processing starts upon launching the information processing apparatus.

In the present exemplary embodiment, a user uses a user hand as a recognition target. Further, in the present exemplary embodiment, it is supposed that a change occurs in the background image when the user places an object on the operation surface. In this case, a change that may occur on the operation surface when the display device 106 displays a display object is not taken into consideration.

In the present exemplary embodiment, an image captured by the camera 105 when the display device 106 displays a display object on the operation surface, in a state where both the recognition target and the substantial object are not present, is usable as a background image in the state where the display object is displayed.

Alternatively, as another example processing, the updating unit 204 may acquire contents to be displayed by the display device 106 from the display control unit 206 and may generate a composite background image that includes an operation table image together with the display content. In this case, the display device 106 displays the composite image in such a way as to reflect a change on the operation surface.

However, even when a change occurs on the operation surface when an image is displayed by the display device 106, the processing according to the present exemplary embodiment is applicable to update the background image. In this case, the processing load of the updating unit 204 can be reduced. Further, the recognition target is accurately detectable because the processing apparatus is free from noises that may occur when the content to be displayed by the display device 106 is detected as a moving member due to a physical deviation in the distance between the projector and the operation surface.

First, in step S301, the acquisition unit 201 acquires an input image captured by the camera 105. In the present exemplary embodiment, the input image is a natural image captured by a visible light camera. However, for example, the input image may be an image captured by an infrared camera that can capture an image based on reflected infrared light.

The image acquired by the acquisition unit 201 in step S301 corresponds to one of a plurality of frames that constitutes the video continuously captured by the camera 105, which is periodically updated while the following processing is executed. As an example updating operation, the acquisition unit 201 may update the input image every predetermined number of frames of the video captured by the camera 105 or each constant time.

In step S302, the first detection unit 203 detects an area including a moving member in the input image (hereinafter, referred to as "detects a moving member") based on a background image acquired beforehand and the input image acquired by the acquisition unit 201 according to the background subtraction technique.

In initial processing to be performed immediately after the information processing apparatus is launched, it is supposed that the background image acquired beforehand is an image captured by the camera 105 in a state where the recognition target and the substantial object are not present. A background image updated through the processing described below is used in the second and subsequent processing.

In the present exemplary embodiment, the "moving member" corresponds to an area extracted as a difference between the background image and the input image. More specifically, the moving member is an area in which a change has occurred in the background irrespective of the moving state in an input image acquiring operation. Accordingly, for example, if the background changes when an object placed on the recognition target is removed, the area in which the removed object has ever been present is detected as a moving member, i.e., a difference between the background image and the input image. The first detection unit 203 stores the background image to be used in a moving member detecting operation in the RAM 103.

In step S303, the first detection unit 203 determines whether the detected moving member includes an object other than the user hand (i.e., the recognition target). In the present exemplary embodiment, the first detection unit 203 performs pattern matching with reference to human hand shape data having been learned beforehand and determines whether the moving member includes a human hand based on an acquired likelihood.

If it is determined that the moving member does not include any human hand, there is a possibility that the user handholds the object, or the object is placed on the operation surface, or the placed object has been removed. Therefore, it is determined that the detected moving member includes an object other than the recognition target.

If it is determined that the object other than the recognition target is included (Yes in step S303), updating the background image becomes necessary. Therefore, the operation proceeds to step S304. On the other hand, if it is determined that the detected moving member is the recognition target (No in step S303), updating the background image becomes necessary. Therefore, the operation proceeds to step S313.

In step S304, the setting unit 205 sets the entire input image as a background undetermined area. In the initial state, the entire input image is set beforehand as a background determined area in which the information processing apparatus recognizes a user operation. The background determined area is an area in which a background image to be used to detect the recognition target based on the background subtraction technique is already determined and a moving member (i.e., a detection result) is determined as the recognition target.

On the other hand, the background undetermined area is an area in which a background image to be used to detect the recognition target based on the background subtraction technique is not yet determined. In the present exemplary embodiment, to avoid an erroneous recognition, the information processing apparatus does not recognize any user operation in the background undetermined area.

When the setting unit 205 sets the entire input image as the background undetermined area in step S304, the setting unit 205 sends a notification to the display control unit 206 to inform that all display objects displayed on the operation surface has been invalidated. In this case, the display control unit 206 can delete each invalidated display object from the display content or change the color of the object when a display image is generated and output to the display device 106, to inform a user that the display object is inoperable.

In step S305, the division unit 202 divides the imaging range of the camera 105 into a plurality of partial areas. In the present exemplary embodiment, the division unit 202 divides the entire imaging range into two or more partial areas each having a constant rectangular shape. Then, the division unit 202 stores each partial area (i.e., one of divided areas) of the input image in association with a partial area (i.e., one of divided areas) of the background image.

In step S306, the updating unit 204 selects one of the partial areas (i.e., divided areas).

Then, in step S307, the updating unit 204 determines whether the input image coincides with the background image in the selected partial area. If the input image coincides with the background image, no moving member is present in the background of the partial area. Therefore, it is understood that updating the background image is unnecessary.

If it is determined that the input image does not coincide with the background image in the selected partial area (No in step S307), it may be necessary to update the background. Therefore, the operation proceeds to step S308. If it is determined that the input image coincides with the background image in the selected partial area (Yes in step S307), the operation proceeds to step S310 while skipping the background image updating processing to be performed in step S309.

In step S308, the updating unit 204 determines whether the detected moving member has stopped in the selected partial area. The updating unit 204 acquires the input image of the selected partial area, from the acquisition unit 201, by a plurality of frames that corresponds to a predetermined continuous time, to perform comparison. As a result of the comparison, if no change occurs, the updating unit 204 determines that the moving member has stopped in the selected partial area.

In the present exemplary embodiment, if the image has not changed in two seconds, the updating unit 204 determines that the selected partial area is stationary. If it is determined that the selected partial area is stationary (Yes in step S308), the operation proceeds to step S309. If it is determined that the selected partial area is not stationary (No in step S308), there is a higher possibility of involving the recognition target in the selected area. Therefore, the operation proceeds to step S310 while skipping the background image updating processing to be performed in step S309.

In step S309, the updating unit 204 updates the background image of the selected partial area. In the present exemplary embodiment, the updating unit 204 sets a partial area image that corresponds to the finally acquired input image at this timing as a background image of the selected partial area, and updates a corresponding portion of the background image stored in the first detection unit 203.

Next, in step S310, the updating unit 204 determines whether there is any unselected partial area. In the present exemplary embodiment, as an example determination method, the updating unit 204 sets a selection flag for any partial area selected in step 306 so that the presence of any unselected partial area can be checked with reference to the selection flag.

If it is determined that at least one unselected partial area is present (Yes in step S310), the operation returns to step S306 to repeat the above-mentioned processing in steps S306 to S310 for the next remaining partial area. If it is determined that all partial areas has been selected (No in step S310), the operation proceeds to step S311.

In step S311, the setting unit 205 sets each of a plurality of partial areas as a background determined area if no change occurs in the background or if the background image has been updated.

In the present exemplary embodiment, as an area discrimination method, the updating unit 204 sets a moving member flag for the partial area if the determination result in step S308 is "NO". The setting unit 205 sets the partial area as the background determined area if the moving member flag is not set.

In this case, the setting unit 205 sends a notification to the display control unit 206 to inform that the display object included in the background determined area has been validated. When the display object is in a valid state, a user operation can be recognized if a user operates the UI.

The display control unit 206 informs that a user can perform the operation by outputting a display image including each validated display object or a color changed display object to the display device 106.

In step S312, the first detection unit 203 detects the recognition target in the background determined area. The first detection unit 203 detects a moving member based on the background subtraction technique using the background image stored in the RAM 103 and an input image newly acquired by the acquisition unit 201.

There is a higher possibility that the detected moving member is the user hand (i.e., the recognition target) because the background image has been updated. Therefore, in the present exemplary embodiment, the first detection unit 203 sends a notification to the recognition unit 207 to inform that the detected moving member is the recognition target. Performing pattern matching to be applied to the detected moving member and human hand shape data is useful to identify the user hand.

In step S313, the recognition unit 207 recognizes an operation caused by the recognition target. In the present exemplary embodiment, the recognition unit 207 detects the movement or shape of the user hand or measures the distance between the user hand and the operation surface and, if a predetermined condition is satisfied, the recognition unit 207 recognizes that an operation corresponding to the predetermined condition has been input.

For example, if the distance between the user hand and a position where a specific display object is displayed is shorter than a predetermined distance, it can be regarded that the specific display object has been touched. Therefore, the recognition unit 207 recognizes that an operation corresponding to the specific display object has been input.

Further, if the movement of the user hand coincides with a predetermined gesture pattern, the recognition unit 207 recognizes that an operation corresponding to the gesture pattern has been input.

In step S314, it is determined whether the information processing apparatus has been deactivated by the operation recognized in step S313. In the second and subsequent processing, if it is regarded that the moving member has disappeared in a partial area included in the area having been set as the background undetermined area in the first processing, the partial area is set as a background determined area.

For example, if it is determined that a non-updated background image stored in the first detection unit 203 coincides with the input image (Yes in step S307), it means that the moving member has disappeared from the selected area.

Further, if it is determined that the moving member has stopped (Yes in step S308), there is a higher possibility that the recognition target has disappeared. Accordingly, the setting unit 205 sets the selected area as a background determined area. The information processing apparatus terminates the user action originated operation recognition processing when it is deactivated.

In the present exemplary embodiment, the information processing apparatus repeats the above-mentioned processing until it is deactivated.

An example of an operation by a user who operates the information processing apparatus according to the first exemplary embodiment is described below with reference to FIGS. 4A to 4D.

Figure 4A:
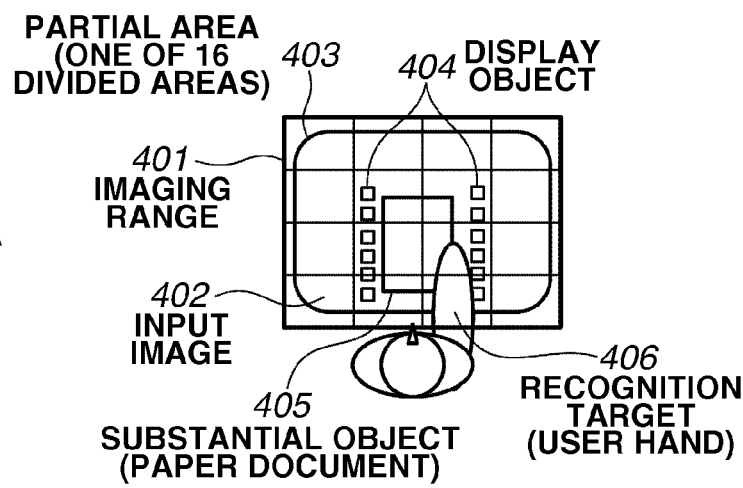
FIGS. 4A to 4D illustrate an example of user operations performed for the information processing apparatus.

FIG. 4A illustrates an operational state where a user has placed a paper document (i.e., a substantial object) 405 on the operation surface. In this case, the display control unit 206 displays a plurality of display objects 404 around the paper document 405. In the operation example described in the present exemplary embodiment, each black rectangle expresses a display object whose operation is validated and each white rectangle expresses a display object whose operation is invalidated.

First, in step S301, the acquisition unit 201 acquires an input image 402 of an imaging range 401 captured by the camera 105. Then, in step S302, the first detection unit 203 detects a recognition target (i.e., user hand) 406, as a moving member, based on the background subtraction technique.

More specifically, in this case, an object other than the recognition target is included in the moving member (Yes in step S303). Therefore, it is necessary to update the background image. Thus, in step S304, the setting unit 205 sets the entire input image 402 as a background undetermined area.

Accordingly, all display objects 404 are invalidated. The display control unit 206 displays each display object 404 as a white rectangle. Then, in step S305, the division unit 202 divides the imaging range 401 into 16 partial areas 403.

Figure 4B:
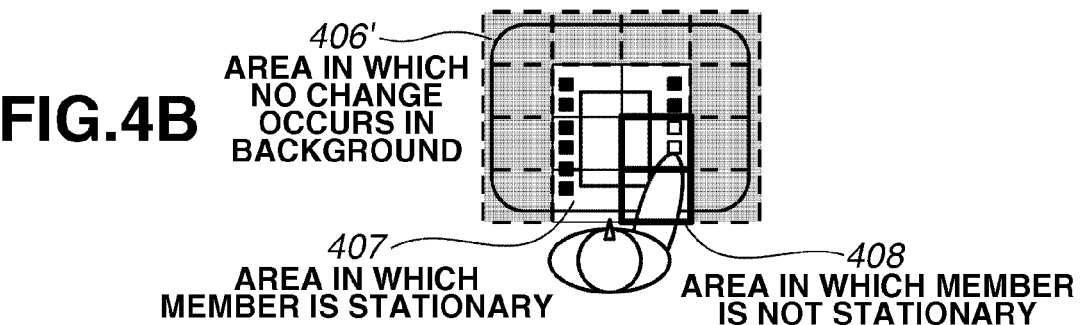

FIG. 4B illustrates an operational state of respective partial areas that have been subjected to background image control processing. An area 406' surrounded with a dotted line, which is a part of the 16 partial areas 403, includes no change in the initial background image (Yes in step S307). Therefore, the updating unit 204 does not perform the background image updating processing.

The moving member is stationary in a background area 407 (Yes in step S308). Therefore, in step S309, the updating unit 204 updates the background image of the area 407. On the other hand, the user hand is moving (is not stationary) in a background area 408 (i.e., an area surrounded with a bold line). Therefore, the updating unit 204 does not update the background image.

Accordingly, in step S311, the setting unit 205 sets the area 408 as a background undetermined area and sets each of the areas 406 and 407 as a background determined area. In other words, the display object 404 in the area 408 remains invalid. In this case, the display control unit 206 displays the display object 404 as a white rectangle in the area 408. On the other hand, other display objects 404 are validated. The display control unit 206 displays the objects 404 as black rectangles in the area 407.

Figure 4C:
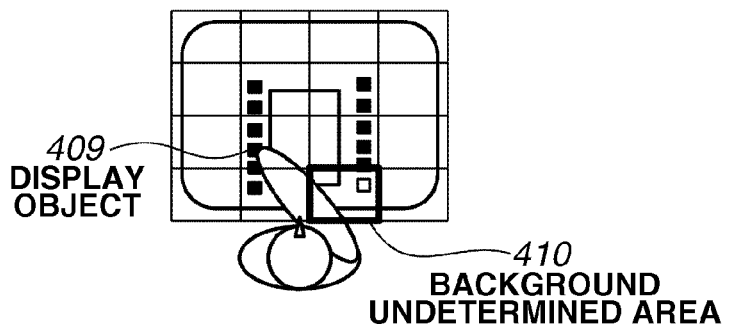

FIG. 4C illustrates an operational state where a user arm has moved to touch a validated display object 409. The first detection unit 203 can detect the recognition target (i.e., the user hand) in the background determined area by repeating the user action originated operation recognition processing.

Therefore, the recognition unit 207 can recognize the operation by the user who has touched the display object 409.

Further, if the user hand has disappeared from a partial area of the area 408, the updating unit 204 determines that the partial area is stationary (Yes in step S308). Therefore, in step S309, the updating unit 204 updates the background image of the partial area. As a result, a background undetermined area 410 is reduced.

As mentioned above, the information processing apparatus according to the present exemplary embodiment divides an image into a plurality of areas, updates the background for each divided area, and recognizes a user action originated operation detected based on the background subtraction technique in only the area whose background image has been updated.

Therefore, even if the background changes when a user places an operationally requisite object on the operation surface, it is unnecessary for the user to remove the recognition target from the imaging range of the camera 105. Further, the number of erroneous recognitions can be reduced because the user action detection processing is performed in only the area in which the latest background image has been acquired.

In the above-mentioned exemplary embodiment, the information processing apparatus sets the entire input image as a background undetermined area in step S304. Then, the information processing apparatus performs the background image control processing for all of the divided partial areas. Then, the information processing apparatus sets a background determined area with reference to the result of the background image control processing.

However, it is also useful to set the entire area as a background determined area in an initial state and set a partial area as a background undetermined area if in step S308 the updating unit 204 determines that a partial area image is not stationary.

Further, in the present exemplary embodiment, if, in step S307, the selected partial area coincides with the background image, more specifically, when no change occurs in the image, the information processing apparatus does not update the background image. Thus, the background image updating processing load can be reduced. However, the processing is not limited to the above-mentioned example. For example, it is also useful to update the background image for all stationary partial areas.

Further, in the present exemplary embodiment, the information processing apparatus detects a moving member from an initial state background image in step S302. If the detected moving member includes any object other than the recognition target, the information processing apparatus performs the background image control processing. However, any other method is usable to determine whether to perform the background image control processing.

For example, it is useful to detect a color change that may occur at a predetermined position on the operation surface in an acquired input image. In this case, the information processing apparatus can perform the background image control processing if the color changes because there is a higher possibility that an object is placed on the operation surface.

In a case where a selected mode is a functional mode for performing an operation in a state where a substantial object is placed on the operation surface, it is useful to constantly divide the imaging range and perform the background image control processing regardless of the presence of a change occurring in the background.

A modified example of the first exemplary embodiment is described below. In the first exemplary embodiment, the information processing apparatus does not update the background image in a partial area of the imaging range if a moving object is present because there is a higher possibility that the recognition target is present in this area. In this case, the information processing apparatus sets the non-updated partial area as a background undetermined area.

On the other hand, in the present exemplary embodiment, the information processing apparatus not only sets an area in which the recognition target is possibly present as a background undetermined area but also sets a partial area neighboring the above-mentioned area as another background undetermined area. Such a modification is useful to reduce the number of erroneous recognitions even when only a part of the recognition target is included in the background determined area.

For example, in the first exemplary embodiment, according to the image 908 illustrated in FIG. 9, the user hand is included in the area surrounded with a dotted line (i.e., in two of 16 partial areas of the imaging range), as mentioned above. Therefore, the information processing apparatus does not update the background image in the area surrounded with the dotted line. Accordingly, the information processing apparatus sets the area surrounded with the dotted line as a background undetermined area and sets the remaining area as a background determined area. Then, the information processing apparatus performs recognition target detection processing in only the background determined area based on the background subtraction technique.

An image 910 is an example of the input image obtainable when the user hand has moved. In this case, an image 911 is obtainable by extracting a difference between the background image and the input image in the background determined area. The image 911 does not include a part of the user hand. In this case, the pattern matching applied to the hand gesture may not be accurately performed because the entire user hand cannot be accurately detected.

Especially, the above-mentioned status tends to occur when an intermediate part of the arm cannot be detected and recognized although only the front edge of the hand (i.e., the recognition target) is detected, in a state where the user has stretched the arm, as understood from the image 911. However, there is a higher possibility that the user stretches the arm to touch a displayed display object.

Accordingly, in the modified example of the first exemplary embodiment, the information processing apparatus identifies the position of the user arm that has entered the imaging range. Further, the information processing apparatus identifies a partial area that neighbors the background undetermined area, in which the user hand is possibly present when the user has stretched the arm, in an arm stretch direction. Then, the information processing apparatus sets the identified partial area as a background undetermined area. Thus, an object that is present in the identified partial area is invalidated.

The information processing apparatus according to the modified example of the first exemplary embodiment has an appearance and a hardware configuration that are similar to those described in the first exemplary embodiment. In the modified example of the first exemplary embodiment, the second detection unit 208 identifies the position of the recognition target (e.g., the user hand) that has entered the imaging range by detecting the position of a background undetermined area having been set by the setting unit 205 and a contact point at which the background undetermined area contacts a peripheral edge of the imaging range.

The setting unit 205 according to the modified example of the first exemplary embodiment sets a neighboring partial area in an orientation directed from the above-mentioned user hand entering position toward the background undetermined area (i.e., a user hand entering direction), as a background undetermined area, in addition to the background undetermined area having been already set. Processing to be performed by the remaining functional configuration is similar to the processing described in the first exemplary embodiment.

Figure 5A:
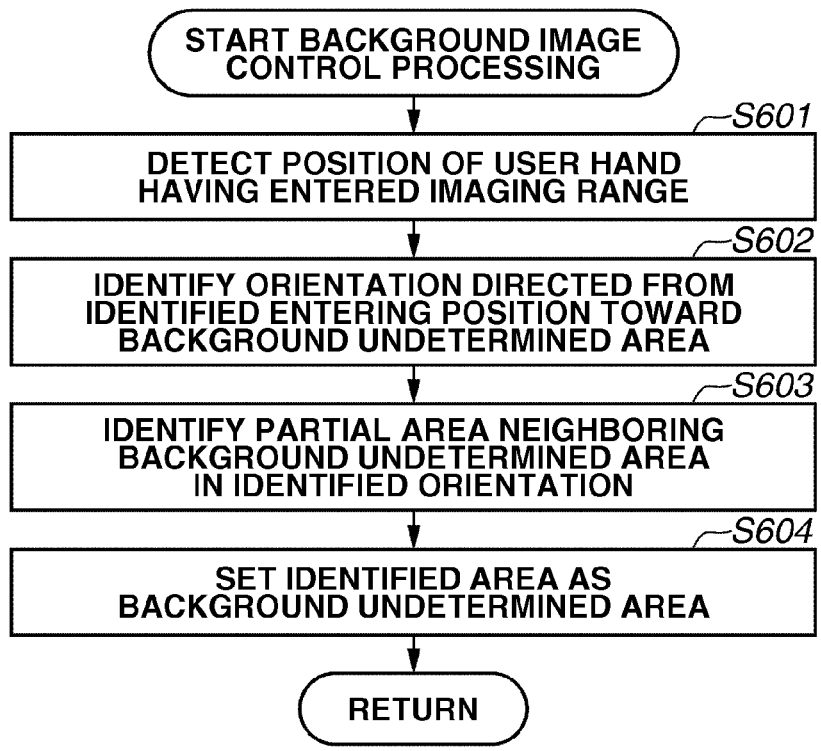
FIG. 5A is a flowchart illustrating an example of background image control processing that can be performed by the information processing apparatus.

FIG. 5A is a flowchart illustrating background image control processing that can be performed by the information processing apparatus according to the modified example of the first exemplary embodiment. In the present modified example, the information processing apparatus executes the background image control processing illustrated in FIG. 5A after completing the processing in steps S301 to S311 of the flowchart illustrated in FIG. 3.

Accordingly, in the present modified example, the operation proceeds to step S601 illustrated in FIG. 5A after the processing in steps S301 to S311 has been completed, similar to the first exemplary embodiment.

In step S601, the second detection unit 208 detects the position of a user hand that has entered the imaging range in the input image.

In the present exemplary embodiment, each partial area has a rectangular shape. Therefore, the second detection unit 208 detects a contact point where a peripheral side of the imaging range contacts a partial area having been set as the background undetermined area by the setting unit 205 in step S311. The second detection unit 208 designates the detected contact point as a user hand entering position. If there is a plurality of background undetermined areas each contacting a peripheral side of the imaging range, for example, when the user arm is bent, the second detection unit 208 designates the entire peripheral side of the imaging range that contacts the background undetermined area as a user hand entering position.

Next, in step S602, the setting unit 205 identifies the orientation directed from the identified entering position toward the background undetermined area (i.e., the user hand entering direction).

In the present exemplary embodiment, each partial area has a rectangular shape. Therefore, the setting unit 205 identifies an inward direction perpendicular to the peripheral side of the imaging range and extending from the position detected in step S601. There is a higher possibility that the operation cannot be accurately recognized in the direction identified in this case because a part of the user hand is included in the background undetermined area when the user hand is stretched in the identified direction.

In step S603, the setting unit 205 identifies a partial area neighboring the already set background undetermined area in the orientation identified in step S602. It is supposed that an erroneous recognition may occur in the partial area identified in this case because a part of the user hand cannot be detected when the user hand is stretched into the identified partial area to perform the operation.

Then, instep S604, the setting unit 205 sets the area identified in step S603 as the background undetermined area. When the above-mentioned setting has been completed, the operation returns to step S312 of the flowchart illustrated in FIG. 3.

An example of an operation by a user who operates the information processing apparatus according to the modified example of the first exemplary embodiment is described below with reference to FIG. 4D.

Figure 4D:
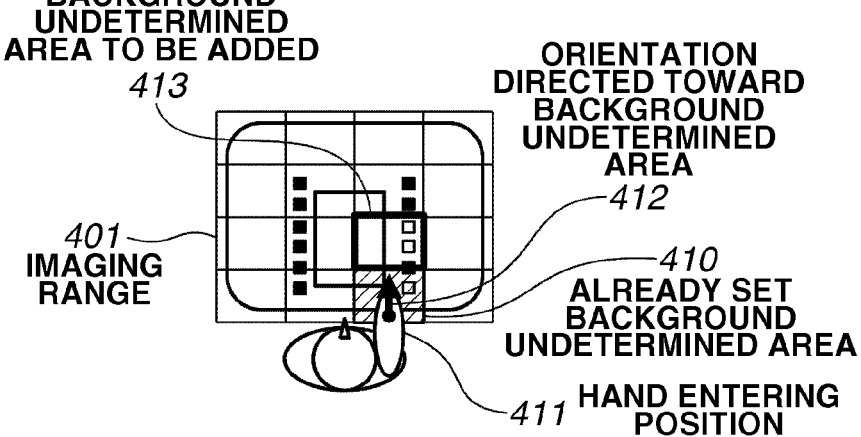

In FIG. 4D, the background undetermined area 410 is already set through sequential processing as illustrated in FIG. 4C. In this case, the second detection unit 208 detects a contact point where a peripheral side of the imaging range 401 contacts the background undetermined area 410. More specifically, in step S601, the second detection unit 208 detects a position 411 of the user hand that has entered the imaging range 401.

Then, in step S602, the setting unit 205 identifies an inward direction 412 that is perpendicular to the peripheral side of the imaging range 401 as an orientation directed from the detected hand entering position 411 toward the background undetermined area 410.

The setting unit 205 sets an area 413 that neighbors the already set background undetermined area 410 in the direction 412, as an additional background undetermined area. Accordingly, each display object 404 to be displayed in the area 413 is invalidated and displayed as a white rectangle by the display control unit 206.

As mentioned above, the information processing apparatus according to the modified example of the first exemplary embodiment identifies a partial area in which an erroneous recognition possibly occurs considering the positional relationship relative to the background undetermined area and sets the identified partial area as a background undetermined area. Controlling validation/invalidation of the UI in a partial area is useful to increase the accuracy in operating the UI.

According to the above-mentioned modified example, the information processing apparatus sets, as an additional background undetermined area, only a partial area that neighbors the background undetermined area having been already set in step S311 in a specific direction. However, the modification of the embodiment is not limited to the above-mentioned example.

For example, it is useful to set all partial areas that are positioned on an extended line that extends in the orientation identified instep S602 as background undetermined areas in addition to the neighboring partial area. Further, it is feasible to set all partial areas each neighboring the background undetermined area having been already set in step S311, regardless of the direction, as background undetermined areas.

However, as described in the present exemplary embodiment, limiting the number of partial areas to be set as background undetermined areas is useful to reduce the stress that a user may have because the operation unrecognizable area can be narrowed.

In a second exemplary embodiment, an example of controlling a display content on the operation surface in such a way as to guide a recognition target to move out of a background undetermined area is described. The second exemplary embodiment is useful to prevent a user hand from continuously remaining in a partial area having been set as a background undetermined area. As a result, it is feasible to efficiently increase the background determined area.

An information processing apparatus according to the second exemplary embodiment has an appearance and a hardware configuration that are similar to those described in the first exemplary embodiment. In the second exemplary embodiment, the second detection unit 208 can identify the position of the recognition target (e.g., the user hand) that has entered the imaging range. To this end, the second detection unit 208 detects the position of an area having been set as a background undetermined area by the setting unit 205 and detects a contact point where the background undetermined area contacts a peripheral edge of the imaging range.

Further, the display control unit 206 according to the modified example of the first exemplary embodiment causes the display device 106 to display a display object that guides the user hand out of the background undetermined area having been set by the setting unit 205. Processing to be performed by the remaining functional configuration is similar to the processing described in the first exemplary embodiment.

Figure 5B:
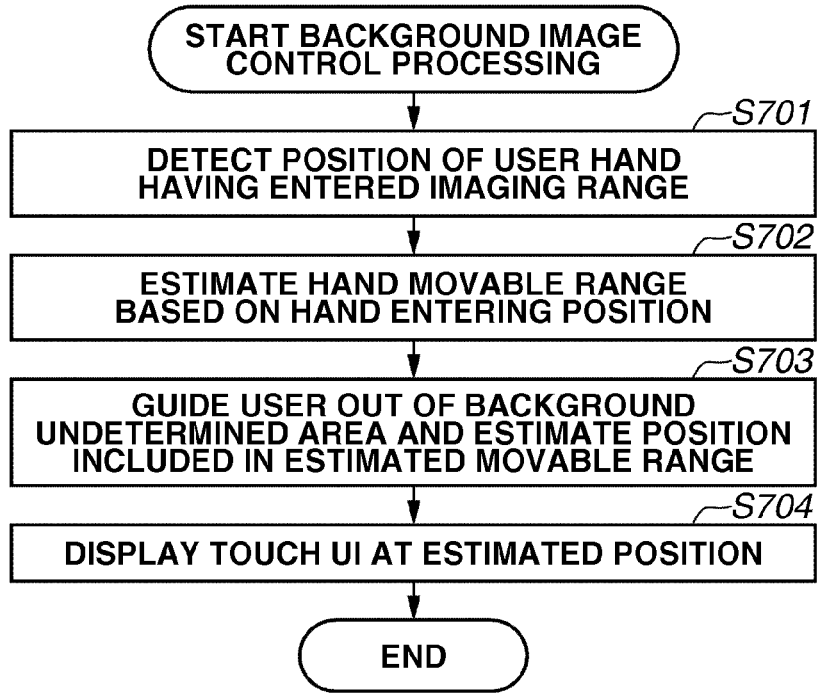
FIG. 5B is a flowchart illustrating another example of the background image control processing that can be performed by the information processing apparatus.

FIG. 5B is a flowchart illustrating background image control processing that can be performed by the information processing apparatus according to the second exemplary embodiment. In the present exemplary embodiment, the information processing apparatus executes the background image control processing illustrated in FIG. 5B after the processing in steps S301 to S311 of the flowchart illustrated in FIG. 3 has been completed.

More specifically, in the present exemplary embodiment, the operation proceeds to step S701 illustrated in FIG. 5B after the background determined area setting processing in step S311 has been completed.

In step S701, the second detection unit 208 detects the position of a user hand that has entered the imaging range. In the present exemplary embodiment, each partial area has a rectangular shape. Therefore, the second detection unit 208 detects a contact point where a peripheral side of the imaging range contacts a partial area having been set as the background undetermined area by the setting unit 205 in step S311. The second detection unit 208 designates the detected contact point as a user hand entering position.

Next, in step S702, the display control unit 206 estimates a hand movable range based on the user hand entering position detected by the second detection unit 208 and information indicating the human hand length in the image learned beforehand. The display control unit 206 stores the estimated positional information.

Then, in step S703, the display control unit 206 estimates a position where the user hand has moves out of the background undetermined area and is involved in the estimated movable range. The display control unit 206 acquires the estimated positional information.

In the present exemplary embodiment, the display control unit 206 estimates a position where the user hand entering position detected in step S701 can be moved in a horizontal direction along a side of the imaging range. For example, the display control unit 206 obtains a range included in the user hand movable range estimated in step S702 in a partial area that neighbors both the background undetermined area set in step S311 and the peripheral side of the imaging range. The display control unit 206 stores the estimated positional information.

In step S704, the display control unit 206 determines a display position of the required display object so that the display object can be disposed in the range indicated by the positional information stored in step S703. The display control unit 206 causes the display device 106 to display the display object at the determined position. The display object to be displayed in this case can be determined according to a user operation status. The display object to be displayed in this case enables the user to launch a function to be next operated.

An example of an operation by a user who operates the information processing apparatus according to the second exemplary embodiment is described below with reference to FIG. 6A.

Figure 6A:
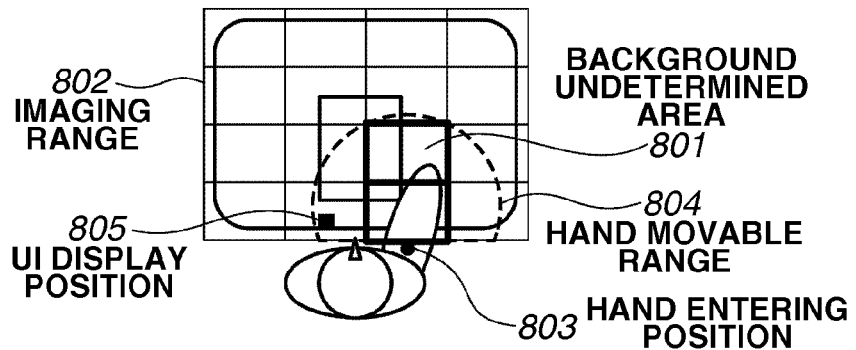
FIGS. 6A to 6D illustrate an example of user operations performed for the information processing apparatus.

In FIG. 6A, the background undetermined area 410 that includes two partial areas is already set through sequential processing as illustrated in FIG. 4C. In this case, the second detection unit 208 detects a contact point where a peripheral side of an imaging range 802 contacts a background undetermined area 801. More specifically, in step S701, the second detection unit 208 detects a position 803 of the user hand that has entered the imaging range 802.

Then, in step S702, the display control unit 206 estimates a hand movable range 804 based on the information indicating the human hand length in the image learned beforehand. Further, the display control unit 206 estimates a range included in the user hand movable range 804 in the partial area that neighbors both the background undetermined area 801 and the peripheral side of the imaging range 802. The display control unit 206 determines a display position 805 of the display object in the estimated range. In step S704, the display control unit 206 causes the display device 106 to display the display object.

As mentioned above, in the present exemplary embodiment, the information processing apparatus controls the position where the display object is to be displayed in such a way as to guide the user hand out of the background undetermined area. As a result, if the user hand is guided out of the background undetermined area, the information processing apparatus performs the background image control processing on all partial areas based on the input image acquired at this time and can obtain an appropriate background image to detect the recognition target based on the background subtraction technique.

Further, according to the information processing apparatus described in the second exemplary embodiment, a user is only required to touch a display object displayed by the information processing apparatus. It is unnecessary for the user to consider the necessity of performing the background image control processing.

In the present exemplary embodiment described above, as illustrated in FIG. 6A, the information processing apparatus displays a display object at an estimated display position to enable a user to perform an operation by touching the display object. However, the way of displaying the display object in step S704 is not limited to the above-mentioned example.

Figure 6B:
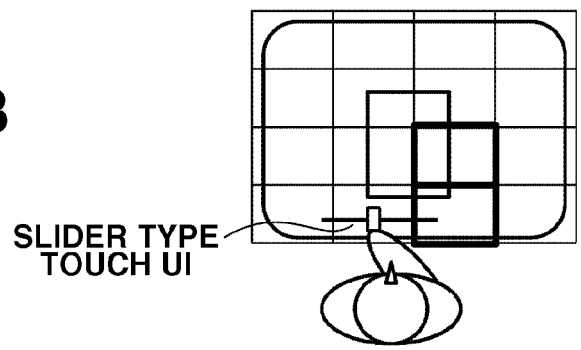

For example, as illustrated in FIG. 6B, it is useful to employ a display pattern that displays a slider or a scroll bar as a display object to enable a user to move the recognition target to perform an operation. The slider or the scroll bar can be displayed in such a way as to straddle a background undetermined area and a background determined area or in the vicinity of a background undetermined area. In this case, the recognition target can be necessarily guided from the background undetermined area to the background determined area. Thus, there is not any recognition target that remains in the background undetermined area. It can be determined that the moving member has stopped. The background can be determined.

The information processing apparatus according to the present exemplary embodiment may be functionally configured to change the display pattern of a display object that enables a user to operate the same function depending on the presence of any remaining background undetermined area.

For example, it is useful to display a display object that is functionally operable as an operational switch for ON/OFF switching a predetermined function as a slider-type switch when a background undetermined area is set by the setting unit 205. In this case, it is useful to dispose the display object in such a way as to guide the user hand out of the background undetermined area.

On the other hand, in a case where the entire imaging range is set as a background determined area, it is feasible to display a button-type switch to perform switching processing. If moving the user hand is unnecessary, selecting an UI that is easy to operate is prioritized. Therefore, the user can naturally continue the operation.

In a third exemplary embodiment, the information processing apparatus estimates a partial area in which the recognition target is possibly present based on the position of a user operated display object that is displayed on the operation surface, in the second and subsequent processing. The information processing apparatus sets the estimated partial area as a background undetermined area, as described below.

Figure 2B:
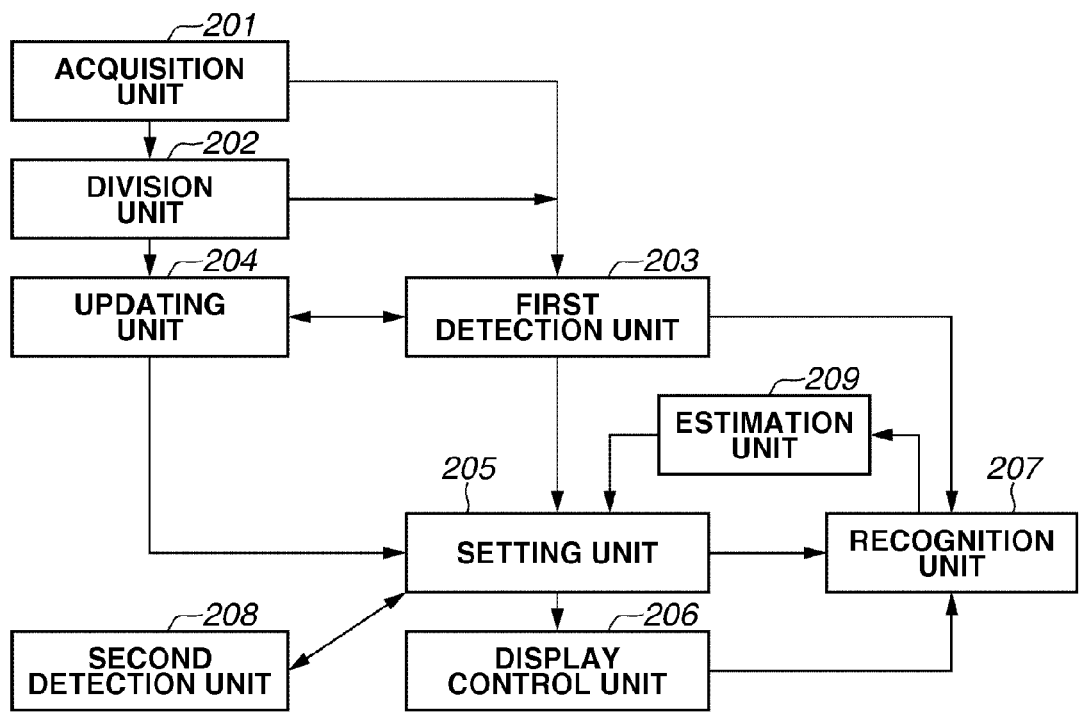

An information processing apparatus according to the third exemplary embodiment has an appearance and a hardware configuration that are similar to those described in the first exemplary embodiment. FIG. 2B illustrates a functional configuration according to the present exemplary embodiment. The information processing apparatus illustrated in FIG. 2B is different from that illustrated in FIG. 2A in additionally including an estimation unit 209 that can be constituted by the CPU 101, the ROM 102, and the RAM 103. The estimation unit 209 is configured to estimate an area in which the recognition target is possibly present based on the position of an operated display object.

Figure 7A:
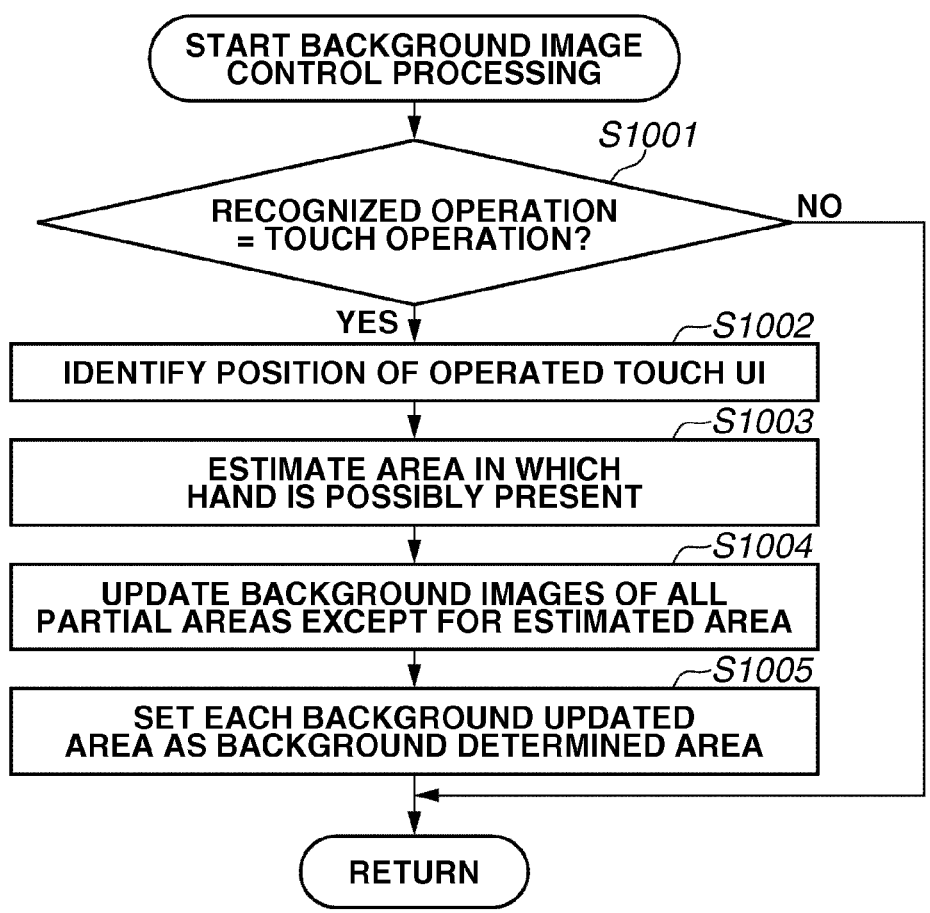
FIG. 7A is a flowchart illustrating an example of background image control processing that can be performed by the information processing apparatus.

FIG. 7A is a flowchart illustrating background image control processing that can be performed by the information processing apparatus in the second exemplary embodiment. In the present exemplary embodiment, the information processing apparatus starts the background image control processing illustrated in FIG. 7A upon completing the processing in steps S301 to S313 of the flowchart illustrated in FIG. 3.

In the present exemplary embodiment, the operation proceeds to step S1001 illustrated in FIG. 7A after the recognition unit 207 has completed the recognition target originated operation recognition processing in step S313.

In step S1001, the estimation unit 209 determines whether the operation recognized by the recognition unit 207 in step S313 is a display object touch operation. If it is determined that the recognized operation is the touch operation (Yes in step S1001), the operation proceeds to step S1002. On the other hand, if it is determined that the recognized operation is not the touch operation (No in step S1001), the information processing apparatus terminates the background image control processing. Then, the operation returns to the user action originated operation recognition processing illustrated in FIG. 3.

In step S1002, the estimation unit 209 identifies the position of the display object operated by the user. In the present exemplary embodiment, the estimation unit 209 identifies a partial area that includes the display position of the operated display object.

Then, in step S1003, the estimation unit 209 estimates an area in which the user hand is possibly present. In the present exemplary embodiment, the estimation unit 209 estimates an area that neighbors the partial area identified in step S1002 as the area in which the user hand is possibly present.

However, it is also useful to identify a coordinate position where the display object has been displayed in step S1002 and estimate a limited area in which the user hand is possibly present based on the identified coordinate position and the human hand length information learned beforehand.

In step S1004, the updating unit 204 updates background images of all partial areas except for the area estimated in step S1003. In the present exemplary embodiment, the updating unit 204 overwrites (updates) the background image based on the corresponding portion of the input image at the time when the display object has been operated in step S313.

In step S1005, the setting unit 205 sets each of the partial areas having been subjected to the background image updating processing performed in step S1004 as background determined area. Accordingly, in the present exemplary embodiment, it becomes feasible to detect the recognition target in the area having been set as the background determined area in step S311 and in the area having been set as the background determined area in step S1005.

If the background determined area setting processing has been completed, the operation returns to the user action originated operation recognition processing illustrated in FIG. 3.

An example of an operation by a user who operates the information processing apparatus according to the third exemplary embodiment is described below with reference to FIG. 6C.

Figure 6C:
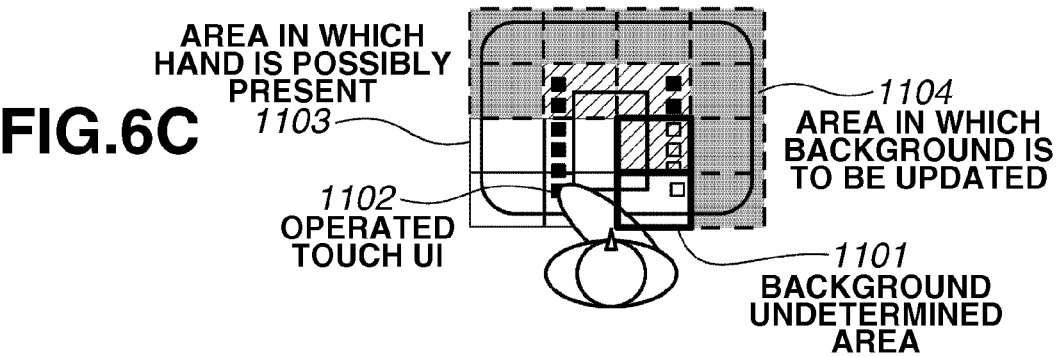

FIG. 6C includes a background undetermined area 1101 that includes two partial areas is already set through sequential processing as illustrated in FIG. 4B. In this case, it is presumed that an operation by the user who touches a display object 1102 has been recognized (Yes in step S1001). In step S1003, the estimation unit 209 estimates a partial area including the operated display object and a neighboring partial area as an area 1103 in which the user hand is possibly present.

Then, in step S1004, the updating unit 204 updates the background image of an area 1104 other than the estimated area 1103. Then, in step S1005, the setting unit 205 sets the updated area 1104 as an additional background determined area. As a result, the background undetermined area can be reduced in the same manner as the example illustrated in FIG. 4C.

As mentioned above, when a display object is touched by a user, the information processing apparatus according to the present exemplary embodiment estimates an area in which the user hand is possibly present based on the touched position. Accordingly, determining whether each partial area is stationary is unnecessary. Further, simultaneously updating background images of a plurality of partial areas is feasible.

To determine whether the partial area is stationary, it is necessary to acquire an input image that corresponds to a plurality of frames of a video captured by the camera 105, to perform comparison. Thus, employing the present exemplary embodiment brings an effect of reducing the required processing time.

In a fourth exemplary embodiment, a granularity level to be referred to in dividing the imaging range is changed according to the position where a display object is displayed and the position where a recognition target is detected, as described below.

An information processing apparatus according to the fourth exemplary embodiment has an appearance and a hardware configuration that are similar to those described in the first exemplary embodiment. The division unit 202 according to the present exemplary embodiment changes the granularity level to be referred to in dividing the imaging range based on positional information of a display object to be displayed by the display control unit 206 or positional information of a recognition target detected by the first detection unit 203. Processing to be performed by the remaining functional configuration is similar to the processing described in the first exemplary embodiment.

First, in FIG. 8A, an overhead view 1501 (positioned on the left side) includes finely divided areas in a peripheral region of a display object displayed on the operation surface. FIG. 8B is a flowchart illustrating area division processing for realizing the division example illustrated by the overhead view 1501. In the present exemplary embodiment, the information processing apparatus performs the user action originated operation recognition processing according to the flowchart illustrated in FIG. 3. However, in step S305, the information processing apparatus performs the area division processing illustrated in FIG. 8B.

Accordingly, in the present exemplary embodiment, the information processing apparatus performs processing according to the flowchart illustrated in FIG. 3, similar to the first exemplary embodiment. The operation proceeds to step S1201 illustrated in FIG. 8B after completing the processing of step S304 in which the entire imaging range is set as the background undetermined area.

In step S1201, the division unit 202 acquires positional information relating to the display object displayed on the operation surface from the display control unit 206. Alternatively, it is useful to identify positional information of a display object that is being actually displayed by analyzing the input image acquired by the acquisition unit 201.

In step S1202, the division unit 202 determines the size of each partial area according to the acquired positional information of the display object. In the present exemplary embodiment, the division unit 202 divides a predetermined range that includes the acquired display object at the center thereof into fine partial areas each having a ¼ size compared to the remaining range.

In step S1203, the division unit 202 divides the imaging range into partial areas having the size determined in step S1202. Then, the operation returns to the user action originated operation recognition processing illustrated in FIG. 3.

Next, in FIG. 8A, an overhead view 1502 (positioned at the right thereof) includes finely divided areas in a peripheral region of a moving area (i.e., an area including a moving member) detected by the first detection unit 203. According to the example of the overhead view 1502, the information processing apparatus performs area division processing illustrated in FIG. 8C as processing to be performed in step S305 of the user action originated operation recognition processing illustrated in FIG. 3.

First, in step S1204, the division unit 202 acquires positional information of the moving area detected by the first detection unit 203.

In step S1205, the division unit 202 determines the size of each partial area according to the acquired positional information of the moving area. In the present exemplary embodiment, the division unit 202 divides a predetermined range that includes the acquired moving area at the center thereof into fine partial areas each having a ¼ size compared to the remaining range.

In step S1206, the division unit 202 divides the imaging range into partial areas having the size determined in step S1205. Then, the operation returns to the user action originated operation recognition processing illustrated in FIG. 3.

As mentioned above, in the present exemplary embodiment, the information processing apparatus divides the imaging range into fine partial areas in a limited region near the position where the display object is displayed or the position where the recognition target is detected. In general, there is a higher possibility that the recognition target may move into the vicinity of the displayed display object. Therefore, accurately detecting the recognition target in this particular area is desired.

There is a higher possibility that the moving area detected by the first detection unit 203 includes the recognition target. Therefore, accurately performing the detection in the moving area is desired. As described in the present exemplary embodiment, when partial areas are finely divided, the recognition target (i.e., the moving member) immediately disappears from a finely divided area if the recognition target moves slightly.

More specifically, the finely divided area becomes stationary even if the movement of the recognition target is small. It is advantageous in increasing the area in which the background image can be updated. Accordingly, the information processing apparatus according to the present invention can finely update the background image and can enlarge the background determined area in which the user operation can be recognized.

In the above-mentioned modified example of the first exemplary embodiment, if a part of the recognition target cannot be detected because the part of the recognition target is included in a background undetermined area, the information processing apparatus performs processing for enlarging the background undetermined area in such a way as to eliminate any erroneous recognition.

On the other hand, in the present exemplary embodiment, in a situation where only a part of the recognition target is detected, a method other than the background subtraction technique is used to assist the detection of the entire recognition target based on limited image information and recognize a user operation, as described below.

An information processing apparatus according to a fifth exemplary embodiment has an appearance, a hardware configuration, and a functional configuration, which are similar to those described in the first exemplary embodiment. However, the first detection unit 203 according to the present exemplary embodiment is configured to detect a moving member by analyzing image information relating to a moving area (i.e., an area including the moving member) detected based on the background subtraction technique and extracting the shape of the moving member from the input image.

Figure 7B:
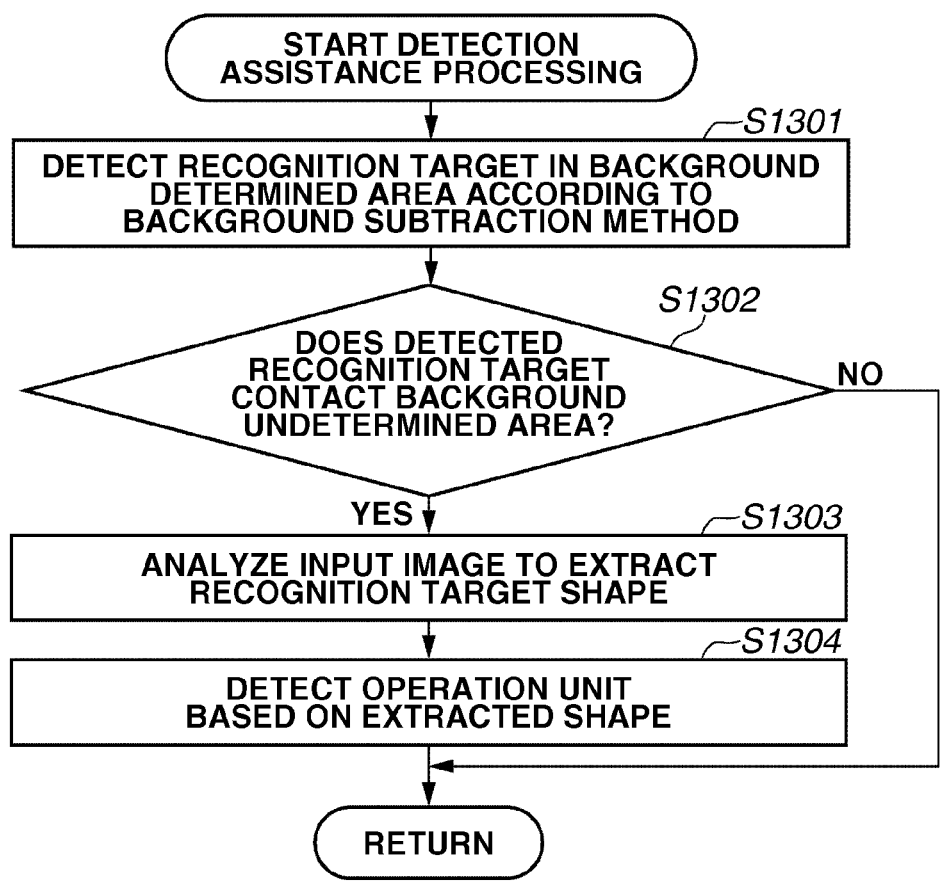
FIG. 7B is a flowchart illustrating an example of detection assistance processing that can be performed by the information processing apparatus.

Next, FIG. 7B is a flowchart illustrating detection assistance processing that can be performed by the information processing apparatus according to the fifth exemplary embodiment. In the present exemplary embodiment, the information processing apparatus performs the user action originated operation recognition processing according to the flowchart illustrated in FIG. 3. However, in step S312, the information processing apparatus performs the detection assistance processing illustrated in FIG. 7B.

Accordingly, in the present exemplary embodiment, the operation proceeds to step S1301 illustrated in FIG. 7B after completing the background determined area setting processing in step S311 of the flowchart illustrated in FIG. 3, similar to the first exemplary embodiment.

In step S1301, the first detection unit 203 detects a recognition target in the background determined area based on the background subtraction technique. The first detection unit 203 detects a moving member based on the background subtraction technique using the updated background image stored in the RAM 103 and an input image newly acquired by the acquisition unit 201. There is a higher possibility that the detected moving member is the user hand (i.e., the recognition target) because the background image has been updated.

In step S1302, the first detection unit 203 determines whether the recognition target detected by the first detection unit 203 contacts the background undetermined area having been set in step S311.

When the detected recognition target contacts the background undetermined area, the recognition target is partly included in the background undetermined area. In other words, there is a higher possibility that the entire recognition target is not detected. Therefore, if it is determined that the detected recognition target contacts the background undetermined area (Yes in step S1302), the operation proceeds to step S1303 to detect the entire recognition target.

On the other hand, if it is determined that the detected recognition target does not contact the background undetermined area (No in step 1302), the operation returns to step S313 of the flowchart illustrated in FIG. 3.

In step S1303, the first detection unit 203 analyzes the input image and extracts the shape of the recognition target. In the present exemplary embodiment, the first detection unit 203 performs image processing on the input image at an area including the recognition target detected in step S1301 and the background undetermined area.

For example, the first detection unit 203 performs processing for detecting an edge from the image. The first detection unit 203 extracts the shape of the entire recognition target by tracing the detected edge from the area including the recognition target to the background undetermined area. However, the method for extracting the shape of the recognition target is not limited to the above-mentioned example. For example, it is useful to verify the continuity in luminance or perform pattern matching using shape data of an elliptic model, a human hand, or an arm.

In step S1304, the first detection unit 203 detects the recognition target based on the extracted shape. In the present exemplary embodiment, the first detection unit 203 determines the area in which the recognition target is present by performing pattern matching applied to the shape extracted through the edge detection processing in step S1303 and human hand shape data learned beforehand.

The operation returns to step S313 of the flowchart illustrated in FIG. 3 after completing the processing for determining the area including the recognition target and detecting the recognition target. However, a recognition target 1404 cannot be detected if the edge or the luminance continuity is insufficient or when a model matching degree is lower in step S1303. In this case, the detection result obtained in step S1301 based on the background subtraction technique can be maintained.

Figure 6D:
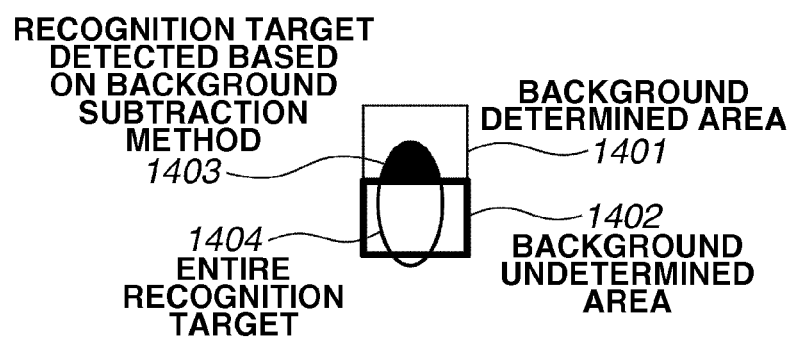

FIG. 6D illustrates an example according to the present exemplary embodiment. If the first detection unit 203 detects the recognition target 1404 based on the background subtraction technique in a state where a background determined area 1401 and a background undetermined area 1402 are set as illustrated in FIG. 6D, a detectable recognition target 1403 (i.e., a black portion) contacts the background undetermined area 1402 (Yes in step S1302).

Accordingly, in the present exemplary embodiment, the information processing apparatus performs image processing on the input image that includes the recognition target 1403 to detect an edge and extract the entire shape of the recognition target 1404.

As mentioned above, in the present exemplary embodiment, if only a part of the recognition target is detected based on the background subtraction technique, the information processing apparatus assists the detection of the entire recognition target using a method other than the background subtraction technique, based on the detected partial image information, to recognize the user operation. Thus, even in a state where the background image of the entire imaging range cannot be updated, the information processing apparatus can detect the recognition target and can recognize the user operation. Therefore, the operability of the information processing apparatus can be improved.

Further, the present invention can be realized by executing the following processing. More specifically, the processing includes supplying a software program that can realize the functions of the above-mentioned exemplary embodiments to a system or an apparatus via a network or an appropriate storage medium, and causing a computer (or a CPU or a micro-processing unit (MPU)) provided in the system or the apparatus to read and executes the program.

According to the present invention, an operation originated by the movement of a recognition target (e.g., a user hand) can be accurately recognized.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   an acquisition unit configured to acquire an image obtained by capturing a space including a predetermined operation area in a background;
   a detection unit configured to detect an object being present on the operation area from the image acquired by the acquisition unit, using an image representing the background of the space;
   a recognition unit configured to recognize an instruction to the apparatus input by a user hand, based on a movement of an object detected by the detection unit; and
   an updating unit configured to update the image representing the background of the space to be used by the detection unit, based on, an image in which an object detected by the detection unit and presumed not to be the user hand is captured in image acquired by the acquisition unit.

2. The apparatus according to claim 1, wherein the updating unit updates a part of the image representing the background of the space to be used by the detection unit, based on, a part of an image acquired by the acquisition unit in which an object detected by the detection unit and presumed not to be the user hand is captured.

3. The apparatus according to claim 1 further comprising a projection unit configured to project a touch target item on the predetermined operation area,
   wherein, in a case where at least a part of an object detected by the detection unit touches the touch target item projected by the projection unit, the recognition unit recognizes an instruction associated with the touched touch target item.

4. The apparatus according to claim 3, wherein, in a case where a movement of a part of an object detected by the detection unit, which is presumed to be the user hand, matches a predetermined gesture model, the recognition unit further recognizes an instruction associated with the gesture model.

5. The apparatus according to claim 1, wherein the detection unit detects the object based on a background subtraction technique using the image representing the background of the space and an image acquired by the acquisition unit.

6. The apparatus according to claim 1,
wherein the image representing the background of the space is an background image obtained by an image capturing unit by capturing a state where the user hand is not present in the space
wherein the updating unit updates the image representing the background of the space, by combining, an image in which an object detected by the detection unit and presumed not to be the user hand is captured in image acquired by the acquisition unit, with the image representing the background.

7. The apparatus according to claim 1, wherein, among objects detected by the detection unit, an object that stays at rest for a time longer than a predetermined time is presumed not to be the user hand.

8. The apparatus according to claim 1, wherein an object which is not the user hand includes a sheet document placed on the predetermined operation area by the user hand.

9. A method comprising:
acquiring, by an acquisition unit, an image obtained by capturing a space including a predetermined operation area in a background;
detecting, by a detection unit, an object being present on the operation area from the acquired image, using an image representing the background of the space;
recognizing an instruction input by a user hand, based on a movement of the detected object; and
updating the image representing the background of the space to be used by the detection unit, based on, an image in which an object detected by the detection unit and presumed not to be the user hand is captured in image acquired by the acquisition unit.

10. A non-transitory computer-readable storage medium configured to store computer executable instructions configured to cause a computer to perform a process comprising:
acquiring, by an acquisition unit, an image obtained by capturing a space including a predetermined operation area in a background;
detecting, by a detection unit, an object being present on the operation area from the acquired image, using an image representing the background of the space;
recognizing an instruction input by a user hand, based on a movement of the detected object; and
updating the image representing the background of the space to be used by the detection unit, based on, an image in which an object detected by the detection unit and presumed not to be the user hand is captured in image acquired by the acquisition unit.

* * * * *